United States Patent
Sani

(10) Patent No.: US 8,808,859 B1
(45) Date of Patent: Aug. 19, 2014

(54) POLYCRYSTALLINE DIAMOND COMPACT INCLUDING PRE-SINTERED POLYCRYSTALLINE DIAMOND TABLE HAVING A THERMALLY-STABLE REGION AND APPLICATIONS THEREFOR

(75) Inventor: Mohammad N. Sani, Orem, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 13/285,198

(22) Filed: Oct. 31, 2011

Related U.S. Application Data

(62) Division of application No. 12/363,104, filed on Jan. 30, 2009, now Pat. No. 8,071,173.

(51) Int. Cl.
*B32B 9/00* (2006.01)

(52) U.S. Cl.
USPC ............... 428/408; 51/307; 51/309; 428/698

(58) Field of Classification Search
USPC ............................. 51/307, 309; 428/408, 698
See application file for complete search history.

(56) References Cited

U.S. PATENT DOCUMENTS

| | | | |
|---|---|---|---|
| 4,016,736 A | 4/1977 | Carrison et al. | |
| 4,268,276 A | 5/1981 | Bovenkerk | |
| 4,274,900 A | 6/1981 | Mueller et al. | |
| 4,410,054 A | 10/1983 | Nagel et al. | |
| 4,460,382 A | 7/1984 | Ohno | |
| 4,468,138 A | 8/1984 | Nagel | |
| 4,560,014 A | 12/1985 | Geczy | |
| 4,692,418 A | 9/1987 | Boecker et al. | |
| 4,738,322 A | 4/1988 | Hall et al. | |
| 4,797,326 A | 1/1989 | Csillag | |
| 4,811,801 A | 3/1989 | Salesky et al. | |
| 4,913,247 A | 4/1990 | Jones | |
| 4,985,051 A | 1/1991 | Ringwood | |
| 4,992,082 A | 2/1991 | Drawl et al. | |
| 5,011,514 A | 4/1991 | Cho et al. | |
| 5,016,718 A | 5/1991 | Tandberg | |
| 5,032,147 A | 7/1991 | Frushour | |

(Continued)

FOREIGN PATENT DOCUMENTS

| | | |
|---|---|---|
| EP | 0 297 071 | 12/1988 |
| EP | 0 352 811 | 1/1990 |

(Continued)

OTHER PUBLICATIONS

U.S. Appl. No. 12/271,081, Oct. 5, 2011, Notice of Allowance.

(Continued)

*Primary Examiner* — Archene Turner
(74) *Attorney, Agent, or Firm* — Dorsey & Whitney LLP

(57) ABSTRACT

In an embodiment, a polycrystalline diamond compact ("PDC") comprises a substrate and a pre-sintered polycrystalline diamond ("PCD") table including a plurality of bonded diamond grains defining a plurality of interstitial regions, an upper surface, and a back surface that is bonded to the substrate. The pre-sintered PCD table includes a first thermally-stable region extending inwardly from the upper surface, and a second region located between the first thermally-stable region and the substrate. The second region exhibits a thermal stability that is less than that of the first thermally-stable region, and includes at least one interstitial constituent disposed interstitially between the bonded diamond grains thereof. The at least one interstitial constituent may include at least one silicon-containing phase.

19 Claims, 6 Drawing Sheets

(56) References Cited

U.S. PATENT DOCUMENTS

| | | |
|---|---|---|
| 5,049,164 A | 9/1991 | Horton et al. |
| 5,092,687 A | 3/1992 | Hall |
| 5,120,327 A | 6/1992 | Dennis |
| 5,127,923 A | 7/1992 | Bunting et al. |
| 5,135,061 A | 8/1992 | Newton, Jr. |
| 5,151,107 A | 9/1992 | Cho et al. |
| 5,154,245 A | 10/1992 | Waldenstrom et al. |
| 5,173,091 A | 12/1992 | Marek |
| 5,217,154 A | 6/1993 | Elwood et al. |
| 5,326,380 A | 7/1994 | Yao et al. |
| 5,348,109 A | 9/1994 | Griffin et al. |
| 5,355,969 A | 10/1994 | Hardy et al. |
| 5,364,192 A | 11/1994 | Damm et al. |
| 5,368,398 A | 11/1994 | Damm et al. |
| 5,460,233 A | 10/1995 | Meany et al. |
| 5,480,233 A | 1/1996 | Cunningham |
| 5,544,713 A | 8/1996 | Dennis |
| 5,617,997 A | 4/1997 | Kobayashi et al. |
| 5,645,617 A | 7/1997 | Frushour |
| 5,660,075 A | 8/1997 | Johnson et al. |
| 5,876,859 A | 3/1999 | Saxelby, Jr. et al. |
| 5,976,707 A | 11/1999 | Grab |
| 6,054,693 A | 4/2000 | Barmatz et al. |
| 6,165,616 A | 12/2000 | Lemelson et al. |
| 6,209,429 B1 | 4/2001 | Urso, III et al. |
| 6,220,375 B1 | 4/2001 | Butcher et al. |
| 6,302,225 B1 | 10/2001 | Yoshida et al. |
| 6,338,754 B1 | 1/2002 | Cannon et al. |
| 6,344,149 B1 | 2/2002 | Oles |
| 6,390,181 B1 | 5/2002 | Hall et al. |
| 6,410,085 B1 | 6/2002 | Griffin et al. |
| 6,435,058 B1 | 8/2002 | Matthias et al. |
| 6,481,511 B2 | 11/2002 | Matthias et al. |
| 6,544,308 B2 | 4/2003 | Griffin et al. |
| 6,562,462 B2 | 5/2003 | Griffin et al. |
| 6,585,064 B2 | 7/2003 | Griffin et al. |
| 6,589,640 B2 | 7/2003 | Griffin et al. |
| 6,592,985 B2 | 7/2003 | Griffin et al. |
| 6,601,662 B2 | 8/2003 | Matthias et al. |
| 6,739,214 B2 | 5/2004 | Griffin et al. |
| 6,749,033 B2 | 6/2004 | Griffin et al. |
| 6,793,681 B1 | 9/2004 | Pope et al. |
| 6,797,326 B2 | 9/2004 | Griffin et al. |
| 6,861,098 B2 | 3/2005 | Griffin et al. |
| 6,861,137 B2 | 3/2005 | Griffin et al. |
| 6,878,447 B2 | 4/2005 | Griffin et al. |
| 6,892,836 B1 | 5/2005 | Eyre et al. |
| 7,060,641 B2 | 6/2006 | Qian et al. |
| 7,377,341 B2 | 5/2008 | Middlemiss et al. |
| 7,384,821 B2 | 6/2008 | Sung |
| 7,473,287 B2 * | 1/2009 | Belnap et al. .......... 51/307 |
| 7,516,804 B2 | 4/2009 | Vail |
| 7,552,782 B1 | 6/2009 | Sexton et al. |
| 7,559,695 B2 | 7/2009 | Sexton et al. |
| 7,569,176 B2 | 8/2009 | Pope et al. |
| 7,635,035 B1 | 12/2009 | Bertagnolli et al. |
| 7,647,993 B2 * | 1/2010 | Middlemiss ............ 428/698 |
| 7,726,421 B2 * | 6/2010 | Middlemiss ............ 175/434 |
| 7,754,333 B2 * | 7/2010 | Eyre et al. ............. 428/408 |
| 7,828,088 B2 | 11/2010 | Middlemiss et al. |
| 7,841,428 B2 | 11/2010 | Bertagnolli |
| 7,845,438 B1 | 12/2010 | Vail |
| 7,866,418 B2 | 1/2011 | Bertagnolli et al. |
| 7,980,334 B2 | 7/2011 | Voronin et al. |
| 8,002,859 B2 | 8/2011 | Griffo et al. |
| 8,066,087 B2 | 11/2011 | Griffo et al. |
| 8,069,937 B2 | 12/2011 | Mukhopadhyay |
| 8,080,071 B1 | 12/2011 | Vail et al. |
| 8,236,074 B1 | 8/2012 | Bertagnolli |
| 8,323,367 B1 | 12/2012 | Bertagnolli |
| 8,328,891 B2 | 12/2012 | Zhang et al. |
| 8,353,371 B2 | 1/2013 | Cooley et al. |
| 8,415,033 B2 | 4/2013 | Matsuzawa et al. |
| 2003/0019333 A1 | 1/2003 | Scott |
| 2004/0111159 A1 | 6/2004 | Pope et al. |
| 2004/0155096 A1 | 8/2004 | Zimmerman et al. |
| 2005/0044800 A1 | 3/2005 | Hall et al. |
| 2005/0050801 A1 | 3/2005 | Cho et al. |
| 2005/0210755 A1 | 9/2005 | Cho et al. |
| 2005/0230156 A1 | 10/2005 | Belnap et al. |
| 2005/0263328 A1 | 12/2005 | Middlemiss |
| 2006/0060390 A1 | 3/2006 | Eyre |
| 2006/0060392 A1 | 3/2006 | Eyre |
| 2006/0191723 A1 | 8/2006 | Keshavan |
| 2007/0056778 A1 | 3/2007 | Webb et al. |
| 2007/0079994 A1 | 4/2007 | Middlemiss |
| 2007/0187153 A1 | 8/2007 | Bertagnolli |
| 2007/0187155 A1 | 8/2007 | Middlemiss |
| 2007/0284152 A1 | 12/2007 | Eyre et al. |
| 2008/0010905 A1 | 1/2008 | Eyre |
| 2008/0085407 A1 | 4/2008 | Cooley et al. |
| 2008/0115421 A1 | 5/2008 | Sani |
| 2008/0206576 A1 | 8/2008 | Qian et al. |
| 2008/0223575 A1 | 9/2008 | Oldham et al. |
| 2008/0223623 A1 | 9/2008 | Keshavan et al. |
| 2008/0230280 A1 | 9/2008 | Keshavan et al. |
| 2008/0247899 A1 | 10/2008 | Cho et al. |
| 2009/0120009 A1 | 5/2009 | Sung |
| 2009/0152015 A1 | 6/2009 | Sani et al. |
| 2009/0152018 A1 | 6/2009 | Sani |
| 2009/0166094 A1 | 7/2009 | Keshavan et al. |
| 2009/0173015 A1 | 7/2009 | Keshavan et al. |
| 2009/0173547 A1 | 7/2009 | Voronin et al. |
| 2010/0012389 A1 | 1/2010 | Zhang et al. |
| 2010/0038148 A1 | 2/2010 | King |
| 2010/0095602 A1 | 4/2010 | Belnap et al. |
| 2010/0122852 A1 | 5/2010 | Russell et al. |
| 2010/0155149 A1 | 6/2010 | Keshavan et al. |
| 2010/0181117 A1 | 7/2010 | Scott |
| 2010/0236836 A1 | 9/2010 | Voronin |
| 2010/0243336 A1 | 9/2010 | Dourfaye et al. |
| 2010/0287845 A1 | 11/2010 | Montross et al. |
| 2011/0023375 A1 | 2/2011 | Sani et al. |
| 2011/0031031 A1 | 2/2011 | Vempati et al. |
| 2011/0067929 A1 | 3/2011 | Mukhopadhyay et al. |
| 2011/0083908 A1 | 4/2011 | Shen et al. |
| 2011/0284294 A1 | 11/2011 | Cox et al. |
| 2012/0037429 A1 | 2/2012 | Davies et al. |
| 2012/0103701 A1 | 5/2012 | Cho et al. |
| 2013/0291443 A1 | 11/2013 | Naidoo et al. |

FOREIGN PATENT DOCUMENTS

| | | |
|---|---|---|
| EP | 0 374 424 | 6/1990 |
| EP | 0 699 642 | 3/1996 |
| GB | 2300424 | 11/1996 |
| GB | 2 461 198 | 12/2009 |
| WO | WO 2008/063568 | 5/2008 |
| WO | WO 2010/039346 | 4/2010 |
| WO | WO 2010/098978 | 9/2010 |
| WO | WO 2010/100629 | 9/2010 |
| WO | WO 2010/100630 | 9/2010 |

OTHER PUBLICATIONS

U.S. Appl. No. 11/545,929, filed Oct. 10, 2006, Bertagnolli.
U.S. Appl. No. 12/120,849, filed May 15, 2008, Vail.
U.S. Appl. No. 12/363,104, filed Jan. 30, 2009, Sani.
U.S. Appl. No. 12/961,787, filed Dec. 7, 2010, Mukhopadhyay, et al.
U.S. Appl. No. 13/032,350, filed Feb. 22, 2011, Sani.
U.S. Appl. No. 60/850,969, filed Oct. 10, 2006, Cooley, et al.
U.S. Appl. No. 60/860,098, filed Nov. 20, 2006, Sani.
U.S. Appl. No. 60/876,701, filed Dec. 21, 2006, Sani.
U.S. Appl. No. 13/230,125, filed Sep. 12, 2011, Sani.
Ekimov, E.A., et al. "Mechanical Properties and Microstructure of Diamond-SiC Nanocomposites" Inorganic Materials, vol. 38, No. 11, 2002, pp. 1117-1122.
PCT International Search Report and Written Opinion for PCT International Application No. PCT/US2007/024090; Apr. 15, 2008.
Declaration of Prior Sales of Terracut PDCS executed by Kenneth E. Bertagnolli Feb. 3, 2011.

(56) References Cited

OTHER PUBLICATIONS

Declaration of Prior Sales of Terracut PDCS executed by Paul D. Jones Feb. 3, 2011.
U.S. Appl. No. 11/983,619, May 26, 2010, Office Action.
U.S. Appl. No. 11/983,619, Aug. 9, 2010, Office Action.
U.S. Appl. No. 11/983,619, Mar. 28, 2011, Office Action.
U.S. Appl. No. 11/983,619, Jun. 16, 2011, Notice of Allowance.
U.S. Appl. No. 11/983,619, Sep. 21, 2011, Issue Notification.
U.S. Appl. No. 12/363,104, Oct. 14, 2010, Office Action.
U.S. Appl. No. 12/363,104, Apr. 12, 2011, Office Action.
U.S. Appl. No. 12/363,104, Aug. 25, 2011, Notice of Allowance.
U.S. Appl. No. 12/271,081, Dec. 22, 2010, Office Action.
U.S. Appl. No. 12/271,081, Mar. 31, 2011, Office Action.
U.S. Appl. No. 12/271,081, Aug. 8, 2011, Office Action.
International Search Report and Written Opinion from International Application No. PCT/US2011/060380 dated Mar. 12, 2012.
U.S. Appl. No. 13/292,491, filed Nov. 9, 2011, Sani.
U.S. Appl. No. 13/230,125, May 23, 2012, Office Action.
U.S. Appl. No. 13/292,491, Aug. 8, 2012, Office Action.
U.S. Appl. No. 13/230,125, Jul. 11, 2012, Office Action.
U.S. Appl. No. 13/032,350, Nov. 26, 2012, Office Action.
U.S. Appl. No. 13/230,125 mailed Jan. 18, 2013, Final Office Action.
Akaishi, Minoru, "Synthesis of polycrystalline diamond compact with magnesium carbonate and its physical properties," Diamond and Related Materials, 1996 (pp. 2-7).
Glowka, D.A. & Stone, C.M., "Effects of Termal and Mechanical Loading on PDC Bit Life", SPE Drilling Engineering, Jun. 1986 (pp. 201-214).
Hosomi, Satoru, et al., "Diamond Formation by a Solid State Reaction", Science and Technology of New Diamond, pp. 239-243 (1990).
Hsueh, C.H. & Evans, A.G., "Residual Stresses in Metal/Ceramic Bonded Strips", J. Am. Ceram. Soc., 68 [5] (1985) pp. 241-248.
Ledbetter, H.M., et al. "Elastic Properties of Metals and Alloys. II. Copper", Journal of Physics and Chemical Reference Data, vol. 3, No. 4, 1974. pp. 897-935.
Lin, Tze-Pin; Hood, Michael & Cooper George A., "Residual Stresses in Polycrystalline Diamond Compacts", J. Am. Ceram Soc., 77 [6] (1994) pp. 1562-1568.
Liu, Xueran, et al., "Fabrication of the supersaturated solid solution of carbon in copper by mechanical alloying", Materials Characterization, vol. 58, Issue 8 (Jun. 2007), pp. 504-508.
Orwa, J.O., et al., "Diamond nanocrystals formed by direct implantation of fused silica with carbon," Journal of Applied Physics, vol. 90, No. 6, 2001, pp. 3007-3018.
Radtke, Robert, "Faster Drilling, Longer Life: Thermally Stable Diamond Drill Bit Cutters," Drilling Systems, Summer 2004 (pp. 5-9).
Saji, S., et al., Solid Solubility of Carbon in Copper during Mechanical Alloying, Materials Transactions, vol. 39, No., 7 (1998), pp. 778-781.
Suryanarayana, C., "Novel Methods of Brazing Dissimilar Materials," Advanced Materials & Processes, Mar. 2001 (3 pgs).
Tanaka, T., et al., "Formation of Metastable Phases of Ni-C and Co-C Systems by Mechanical Alloying", Metallurgical Transactions, vol. 23A, Sep. 1992, pp. 2431-2435.
Timoshenko, S.P. & Goodier, J.N., "Theory of Elasticity", McGraw-Hill Classic Textbook Reissue 1934, pp. 8-11, 456-458.
Tomlinson, P.N. et al. "Syndax3 Pins-New Concepts in PCD Drilling," Rock Drilling, IDR 3/92, 1992 (pgs. 109-114).
Ueda, Fumihiro, "Cutting performance of sintered diamond with MgCO3 as a sintering agent," Materials Science and Engineering, 1996 (pgs. 260-263).
Yamane, T., et al., "Solid solubility of carbon in copper mechanically alloyed", Journal of Materials Science Letters 20 (2001), pp. 259-260.
U.S. Appl. No. 11/545,929, mailed Aug. 13, 2008, Office Action.
U.S. Appl. No. 11/545,929, mailed Jan. 21, 2009, Office Action.
U.S. Appl. No. 11/545,929, mailed Aug. 27, 2009, Office Action.
U.S. Appl. No. 11/545,929, mailed Apr. 15, 2010, Office Action.
U.S. Appl. No. 11/545,929, mailed Jul. 21, 2010, Office Action.
U.S. Appl. No. 11/545,929, mailed Mar. 20, 2012, Notice of Allowance.
U.S. Appl. No. 11/545,929, mailed Jul. 18, 2012, Issue Notificaiton.
U.S. Appl. No. 12/394,356, mailed Sep. 1, 2011, Notice of Allowance.
U.S. Appl. No. 12/394,356, mailed Nov. 30, 2011, Issue Notificaiton.
U.S. Appl. No. 12/397,969, mailed May 25, 2012, Notice of Allowance.
U.S. Appl. No. 12/397,969, mailed Nov. 14, 2012, Issue Notificaiton.
U.S. Appl. No. 12/548,584, mailed May 18, 2012, Office Action.
U.S. Appl. No. 12/548,584, mailed Oct. 24, 2012, Office Action.
U.S. Appl. No. 12/548,584, mailed Jan. 3, 2013, Office Action.
U.S. Appl. No. 13/032,350, mailed Mar. 14, 2013, Office Action.
U.S. Appl. No. 13/171,735, mailed Aug. 17, 2012, Office Action.
U.S. Appl. No. 13/171,735, mailed Jan. 24, 2013, Office Action.
U.S. Appl. No. 13/292,491, mailed Feb. 11, 2013, Office Action.
U.S. Appl. No. 13/690,397, mailed Feb. 14, 2013, Office Action.
U.S. Appl. No. 13/690,397, mailed May 29, 2013, Notice of Allowance.
U.S. Appl. No. 12/961,787, mailed May 29, 2013, Restriction Requirement.
U.S. Appl. No. 13/230,125, mailed May 1, 2013, Notice of Allowance.
U.S. Appl. No. 13/292,900, mailed May 23, 2013, Office Action.
U.S. Appl. No. 13/953,453, filed Jul. 29, 2013, Sani.
U.S. Appl. No. 12/548,584, mailed Jun. 14, 2013, Office Action.
U.S. Appl. No. 12/548,584, mailed Sep. 26, 2013, Office Action.
U.S. Appl. No. 13/032,350, mailed Sep. 30, 2013, Office Action.
U.S. Appl. No. 13/100,388, mailed Oct. 18, 2013, Office Action.
U.S. Appl. No. 13/171,735, mailed Jul. 12, 2013, Office Action.
U.S. Appl. No. 13/230,125, mailed Aug. 21, 2013, Issue Notification.
U.S. Appl. No. 13/292,491, mailed Jul. 18, 2013, Office Action.
U.S. Appl. No. 13/027,954, mailed Jul. 18, 2013, Office Action.
U.S. Appl. No. 13/690,397, mailed Aug. 9, 2013, Office Action.
U.S. Appl. No. 13/917,952, mailed Jul. 31, 2013, Office Action.
U.S. Appl. No. 12/961,787, mailed Aug. 30, 2013, Office Action.
U.S. Appl. No. 13/323,138, mailed Oct. 1, 2013, Office Action.
U.S. Appl. No. 13/953,453, mailed Sep. 19, 2013, Office Action.
U.S. Appl. No. 13/953,453, mailed Oct. 10, 2013, Office Action.
U.S. Appl. No. 14/067,831, filed Oct. 30, 2013, Bertagnolli et al.
U.S. Appl. No. 14/178,118, filed Feb. 11, 2014, Mukhopadhyay et al.
U.S. Appl. No. 13/100,388, mailed Jan. 15, 2014, Office Action.
U.S. Appl. No. 13/171,735, mailed Jan. 10, 2014, Office Action.
U.S. Appl. No. 13/292,491, mailed Oct. 29, 2013, Office Action.
U.S. Appl. No. 13/027,954, mailed Nov. 13, 2013, Office Action.
U.S. Appl. No. 13/690,397, mailed Nov. 25, 2013, Office Action.
U.S. Appl. No. 13/917,952, mailed Nov. 13, 2013, Office Action.
U.S. Appl. No. 13/292,900, mailed Oct. 22, 2013, Notice of Allowance.
U.S. Appl. No. 13/292,900, mailed Nov. 25, 2013, Notice of Allowance.
U.S. Appl. No. 13/292,900, mailed Jan. 30, 2014, Notice of Allowance.
U.S. Appl. No. 13/323,138, mailed Nov. 29, 2013, Notice of Allowance.
U.S. Appl. No. 12/548,584, mailed Mar. 6, 2014, Notice of Allowance.
U.S. Appl. No. 13/032,350, mailed Apr. 15, 2014, Notice of Allowance.
U.S. Appl. No. 13/171,735, mailed May 7, 2014, Notice of Allowance.
U.S. Appl. No. 13/292,491, mailed Mar. 21, 2014, Office Action.
U.S. Appl. No. 13/027,954, mailed Mar. 10, 2014, Office Action.
U.S. Appl. No. 13/690,397, mailed Mar. 12, 2014, Notice of Allowance.
U.S. Appl. No. 12/961,787, mailed Apr. 11, 2014, Office Action.
U.S. Appl. No. 13/323,138, mailed Mar. 12, 2014, Notice of Allowance.
U.S. Appl. No. 13/953,453, mailed Mar. 18, 2014, Office Action.
U.S. Appl. No. 13/027,954, mailed Jun. 3, 2014, Notice of Allowance.

(56) References Cited

OTHER PUBLICATIONS

U.S. Appl. No. 13/292,900, mailed May 28, 2014, Issue Notification.
U.S. Appl. No. 13/917,952, mailed Jun. 11, 2014, Issue Notification.
U.S. Appl. No. 12/548,584, mailed Jun. 25, 2014, Issue Notification.
U.S. Appl. No. 13/100,388, mailed Jun. 17, 2014, Notice of Allowance.
U.S. Appl. No. 13/953,453, mailed Jun. 24, 2014, Notice of Allowance.

* cited by examiner

POLYCRYSTALLINE DIAMOND COMPACT INCLUDING PRE-SINTERED POLYCRYSTALLINE DIAMOND TABLE HAVING A THERMALLY-STABLE REGION AND APPLICATIONS THEREFOR

CROSS-REFERENCE TO RELATED APPLICATIONS

This application is a division of U.S. application Ser. No. 12/363,104 filed on 30 Jan. 2009, the contents of which are incorporated herein, in their entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented-carbide substrate into a container or cartridge with a volume of diamond particles positioned on a surface of the cemented-carbide substrate. A number of such cartridges may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of a matrix of bonded diamond grains having diamond-to-diamond bonding therebetween, with interstitial regions between the bonded diamond grains being occupied by the solvent catalyst.

The presence of the solvent catalyst in the PCD table is believed to reduce the thermal stability of the PCD table at elevated temperatures. For example, the difference in thermal expansion coefficient between the diamond grains and the solvent catalyst is believed to lead to chipping or cracking of the PCD table during drilling or cutting operations, which consequently can degrade the mechanical properties of the PCD table or cause failure. Additionally, some of the diamond grains can undergo a chemical breakdown or back-conversion to graphite via interaction with the solvent catalyst. At elevated high temperatures, portions of the diamond grains may transform to carbon monoxide, carbon dioxide, graphite, or combinations thereof, causing degradation of the mechanical properties of the PCD table.

One conventional approach for improving the thermal stability of PDCs is to at least partially remove the solvent catalyst from the PCD table of the PDC by acid leaching. In another conventional approach for forming a PDC, a sintered PCD table may be separately formed and then leached to remove the solvent catalyst from interstitial regions between bonded diamond grains. The leached PCD table may be simultaneously HPHT bonded to a cemented-carbide substrate and infiltrated with silicon in a separate HPHT process. The silicon may infiltrate the interstitial regions of the leached PCD table from which the solvent catalyst has been leached and react with the diamond grains to form silicon carbide.

Despite the availability of a number of different PDCs, manufacturers and users of PDCs continue to seek PDCs that exhibit improved toughness, wear resistance, and/or thermal stability.

SUMMARY

Embodiments of the invention relate to PDCs including a pre-sintered PCD table exhibiting at least a thermal stability that is locally enhanced due to exposure to an acid, and methods of fabricating such PDCs. In an embodiment, a PDC comprises a substrate and a pre-sintered PCD table including a plurality of bonded diamond grains defining a plurality of interstitial regions, an upper surface, and a back surface that is bonded to the substrate. The pre-sintered PCD table includes a first thermally-stable region extending inwardly from the upper surface, and a second region located between the first thermally-stable region and the substrate. The second region exhibits a thermal stability that is less than that of the first thermally-stable region, and includes at least one interstitial constituent disposed interstitially between the bonded diamond grains thereof. The at least one interstitial constituent may include at least one silicon-containing phase.

In an embodiment, a method of fabricating a PDC includes forming an assembly. The assembly includes an at least partially leached PCD table having a plurality of interstitial regions therein and a surface, at least one silicon containing layer positioned adjacent to the surface of the at least partially leached PCD table, and a substrate positioned at least proximate to the at least partially leached PCD table. The method also includes subjecting the assembly to an HPHT process. The method further includes at least partially infiltrating the at least partially leached polycrystalline diamond table with the at least one silicon-containing layer, in response to the HPHT process, to form an at least partially infiltrated PCD table. The method additionally includes exposing the at least partially infiltrated PCD table to an acid such that at least a thermal stability thereof is enhanced.

Other embodiments include applications utilizing the disclosed PDCs in various articles and apparatuses, such as rotary drill bits, machining equipment, and other articles and apparatuses.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PDCs including a pre-sintered PCD table exhibiting at least a thermal stability that is locally enhanced due to exposure to an acid, and methods of fabricating such PDCs. The disclosed PDCs herein may be used in a variety of applications, such as rotary drill bits, mining tools, drill bits, bearing apparatuses, wire-drawing dies, machining equipment, and other articles and apparatuses.

Figure 1:
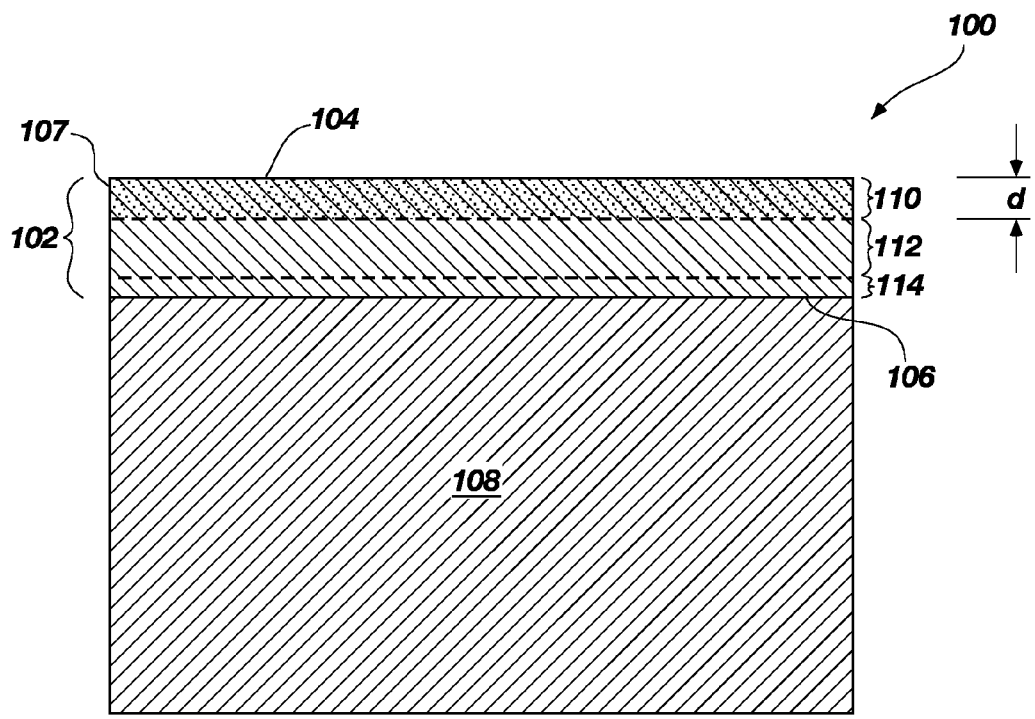
FIG. 1 is a cross-sectional view of an embodiment of a PDC that includes a pre-sintered PCD table that has been acid-treated to enhance at least a thermal stability thereof.

FIG. 1 is a cross-sectional view of an embodiment of a PDC 100. The PDC 100 includes a pre-sintered PCD table 102 having a working upper surface 104, a generally opposing back surface 106, and at least one lateral surface 107 extending therebetween. Although the upper surface 104 is illustrated as being substantially planar, the upper surface 104 may have a nonplanar geometry. Further, the pre-sintered PCD table 102 may include a chamfer that extends about the upper surface 104. Additionally, other regions of the pre-sintered PCD table 102 may also function as a working region, such as the at least one lateral surface 107.

The PDC 100 further includes a substrate 108 bonded to the back surface 106 of the pre-sintered PCD table 102. Suitable materials for the substrate 108 include cemented carbides, such as titanium carbide, niobium carbide, tantalum carbide, vanadium carbide, tungsten carbide, or combinations of any of the preceding carbides cemented with iron, nickel, cobalt, or alloys thereof. In an embodiment, the substrate 108 may comprise cobalt-cemented tungsten carbide. Although the interfacial surface of the substrate 108 is illustrated as being substantially planar, the interfacial surface may exhibit a selected nonplanar geometry and the back surface 106 of the pre-sintered PCD table 102 may exhibit a correspondingly configured geometry.

The pre-sintered PCD table 102 includes bonded diamond grains, with diamond-to-diamond bonding therebetween, which define a plurality of interstitial regions. The pre-sintered PCD table 102 includes an acid treated, first thermally-stable region 110 that extends from the upper surface 104 to an intermediate depth d, a second intermediate region 112 adjacent to the first thermally-stable region 110, and a third bonding region 114 extending from the back surface 106 inwardly to the second intermediate region 112. The depth d to which the first thermally-stable region 110 extends from the upper surface 104 may be less than 100 μm, such as about 10 μm to about 70 μm. As used herein, the phrase "thermally-stable region" refers to a region of a PCD table that exhibits a relatively increased thermal stability compared to one or more other regions of the same PCD table.

The interstitial regions of the third bonding region 114 are occupied by an infiltrant swept-in from the substrate 108 during the HPHT process used to fabricate the PDC 100. For example, when the substrate 108 comprises cobalt-cemented tungsten carbide, the infiltrant may comprise cobalt that may carry tungsten and/or tungsten carbide therewith. The interstitial regions of the second intermediate region 112 include at least one interstitial constituent including at least one silicon-containing phase. The at least one silicon-containing phase may include silicon carbide, a mixed carbide of silicon and cobalt, silicon (e.g., a substantially pure silicon phase), a silicon-cobalt alloy phase, or combinations of the foregoing. For example, the silicon-cobalt alloy phase may include a cobalt-silicon solid solution, one or more types of cobalt silicides, or combinations thereof. In some embodiments, in addition to the at least one silicon-containing phase, the at least one interstitial constituent may also include at least one cobalt-containing phase, such as cobalt carbide, cobalt (e.g., a substantially pure cobalt phase), or combinations thereof.

The interstitial regions of the first thermally-stable region 110 may include at least one interstitial constituent that has been affected by exposure to a suitable acid and such exposure resulting in at least the thermal stability of the first thermally-stable region 110 being greater than that of the second intermediate region 112 and the third bonding region 114 of the pre-sintered PCD table 102. In some embodiments, the wear resistance and/or thermal stability of the first thermally-stable region 110 may be greater than that of the second intermediate region 112 and the third bonding region 114. Prior to exposure to the acid, the at least one interstitial constituent of the first thermally-stable region 110 may include silicon carbide, cobalt carbide, a mixed carbide of silicon and cobalt, silicon, a silicon-cobalt alloy, cobalt, or combinations of the foregoing. Thus, prior to exposure to the acid, the composition of the at least one interstitial constituent of the first thermally-stable region 110 may be the same or very similar to that of the at least one interstitial constituent of the second intermediate region 112.

In an embodiment, the at least one interstitial constituent of the first thermally-stable region 110 may be depleted of cobalt. The depletion of the cobalt may result in the first thermally-stable region 110 being partially or substantially free of cobalt. For example, the first thermally-stable region 110 may be depleted of cobalt that is not included in a chemical compound (e.g., a carbide or a cobalt silicide) compared to the second intermediate region 112 and the third bonding region 114. In such an embodiment, the at least one interstitial constituent of the first thermally-stable region 110 may be selected from silicon carbide, cobalt carbide, a mixed carbide of silicon and cobalt, cobalt silicide, and combinations of the foregoing, while not including substantially any cobalt that is not part of the foregoing chemical compounds. When cobalt is in a chemical compound such as cobalt carbide or cobalt silicide, it is generally not catalytic relative to diamond. Thus, the first thermally-stable region 110 may substantially lack cobalt in a form that is catalytic relative to diamond, which can detrimentally convert the diamond grains of the first thermally-stable region 110 to graphite at the high temperatures commonly experienced when the PDC 100 is employed as a cutting element of a rotary drill bit.

As an alternative to or in addition to the acid depleting the first thermally-stable region 110 of cobalt, in an embodiment, the exposure to the acid may deplete the first thermally-stable region 110 of one or more types of oxides, such as cobalt oxide, silicon oxide, or combinations of the foregoing. Such oxides may be present on the upper surface 104 of the pre-sintered PCD table 102 and/or within the interstitial regions between the bonded diamond grains of the first thermally-stable region 110 prior to exposure to the acid, and may reduce thermal stability. The depletion of the one or more types of oxides may result in the first thermally-stable region 110 being partially or substantially free of such one or more types of oxides.

Figure 2A:
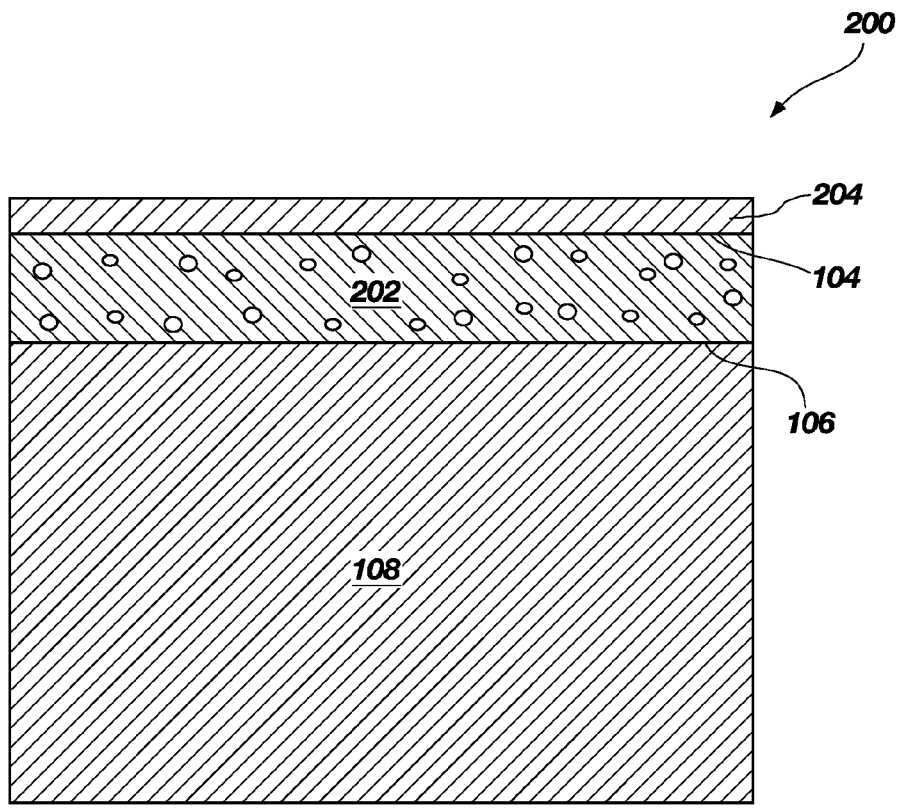
FIGS. 2A and 2B are cross-sectional views illustrating various stages in a method of fabricating the PDC shown in FIG. 1 according to an embodiment.
Figure 2B:
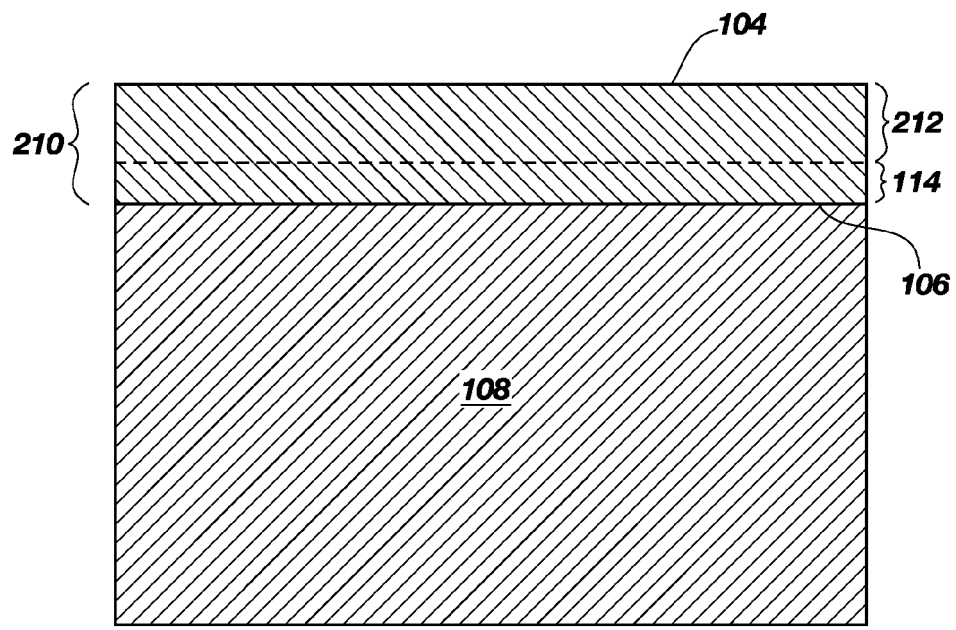

FIGS. 2A and 2B are cross-sectional views illustrating various stages in a method of fabricating the PDC 100 shown in FIG. 1 according to an embodiment. An assembly 200 may be formed by positioning an at least partially leached PCD table 202 between at least one silicon-cobalt containing layer 204 and the substrate 108. The at least partially leached PCD table 202 includes the upper surface 104 and the opposing back surface 106 that is positioned adjacent to the substrate 108. The at least partially leached PCD table 202 also includes a plurality of interstitial regions that were previously occupied by a metal-solvent catalyst and form a network of at least partially interconnected pores that extend between the upper surface 104 and the back surface 106.

The silicon-cobalt containing layer 204 may comprise a mixture of silicon particles and cobalt particles. In one embodiment, the silicon-cobalt containing layer 204 comprises silicon particles present in an amount of about 50 to about 60 weight percent ("wt %") and cobalt particles present in an amount of about 40 to about 50 wt %. In a more specific embodiment, the silicon-cobalt containing layer 204 comprises silicon particles and cobalt particles present in an amount about equal to or near a eutectic composition of the silicon-cobalt chemical system. In some embodiments, the silicon particles and cobalt particles may be held together by an organic binder to form a green layer of cobalt and silicon particles. In another embodiment, the silicon-cobalt containing layer 204 may comprise a thin sheet of a silicon-cobalt alloy or a green layer of silicon-cobalt alloy particles formed by mechanical alloying and having a low-melting eutectic or near eutectic composition.

The assembly 200 may be placed in a pressure transmitting medium, such as a refractory metal can embedded in pyrophyllite or other gasket medium. The pressure transmitting medium, including the assembly 200, may be subjected to an HPHT process using an ultra-high pressure press to create temperature and pressure conditions at which diamond is stable. The temperature of the HPHT process may be at least about 1000° C. (e.g., about 1200° C. to about 1600° C.) and the pressure of the HPHT process may be at least 4.0 GPa (e.g., about 5.0 GPa to about 8.0 GPa) for a time sufficient to liquefy the silicon-cobalt containing layer 204 and infiltrate the interstitial regions of the at least partially leached PCD table 202 (represented as infiltrated PCD table 210 shown in FIG. 2B). For example, the pressure of the HPHT process may be about 5 GPa to about 7 GPa and the temperature of the HPHT process may be about 1150° C. to about 1400° C. (e.g., about 1200° C. to about 1300° C.).

The temperature of the HPHT process is sufficient to cause the silicon-cobalt containing layer 204 to liquefy to form a liquid comprising silicon and cobalt that infiltrates into the interstitial regions of an upper region 212 of the at least partially leached PCD table 202. The interstitial regions of the upper region 212 are occupied with silicon carbide, cobalt carbide, a mixed carbide of silicon and cobalt, a silicon-cobalt alloy phase (e.g., a cobalt-silicon solid solution and/or cobalt silicide), silicon, cobalt, or combinations of the foregoing. Silicon carbide, cobalt carbide, and a mixed carbide of silicon and cobalt may be formed as a result of the liquid comprising silicon and cobalt reacting with the diamond grains of the at least partially leached PCD table 202. The HPHT process also liquefies metal-solvent catalyst present in the substrate 108 and causes the liquefied metal-solvent catalyst to infiltrate into the interstitial regions of the at least partially leached PCD table 202 to form the third bonding region 114. Upon cooling from the HPHT process, the metal-solvent catalyst in the third bonding region 114 forms a strong metallurgical bond between the infiltrated PCD table 210 and the substrate 108. In some embodiments, the volume of the silicon-cobalt containing layer 204 may be selected so that the third bonding region 114 is relatively thin compared to the upper region 212, and infiltrated material from the silicon-cobalt containing layer 204 occupies at least a majority of the interstitial regions of the infiltrated PCD table 210. However, in other embodiments, the volume of the silicon-cobalt containing layer 204 may be selected so that the third bonding region 114 is relatively large compared to the upper region 212, and infiltrated material from the silicon-cobalt containing layer 204 occupies a relatively small population of the interstitial regions of the infiltrated PCD table 210.

The upper region 212 of the infiltrated PCD table 210 may be exposed to an acid to form the first thermally-stable region 110 (FIG. 1) from a portion thereof. The acid may be nitric acid, hydrofluoric acid, aqua regia, mixtures of the foregoing acids, or another suitable acid. As previously discussed above, the first thermally-stable region 110 so-formed by the exposure to the acid may be depleted of cobalt that is not included in a chemical compound relative to the upper region 212 from which it was formed and/or may be depleted of one or more types of oxides. The unaffected portion of the upper region 212 is shown in FIG. 1 as the second intermediate region 112.

In an embodiment, the infiltrated PCD table 210 may be subjected to a mechanical finishing operation prior to or after the upper region 212 is exposed to the acid. The mechanical finishing operations may include grinding, lapping, or combinations thereof. For example, the finishing operations may be used to form a chamfer in the infiltrated PCD table 210.

The at least partially leached PCD table 202 may be fabricated by subjecting a plurality of diamond particles to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented-carbide substrate, or combinations of the foregoing. The bonded diamond grains, so-formed by HPHT sintering the diamond particles, define interstitial regions with the metal-solvent catalyst disposed within the interstitial regions. The diamond particles may exhibit a single-mode diamond particle size distribution, or a bimodal or greater diamond particle size distribution.

The as-sintered PCD body may be leached by immersion in an acid, such as aqua regia, nitric acid, hydrofluoric acid, or subjected to another suitable process to remove at least a portion of the metal-solvent catalyst from the interstitial regions of the PCD body and form the at least partially leached PCD table 202. For example, the as-sintered PCD body may be immersed in the acid for about 2 to about 7 days (e.g., about 3, 5, or 7 days) or for a few weeks (e.g., about 4 weeks) depending on the process employed. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may not be substantially removed by the leaching process and may enhance the wear resistance of the at least partially leached PCD table 202.

The at least partially leached PCD table 202 may be subjected to a shaping process prior to bonding to the substrate 108, such as grinding or lapping, to tailor the geometry thereof, as desired, for a particular application. The as-sintered PCD body may also be shaped prior to leaching or bonding to the substrate 108 by a machining process, such as electro-discharge machining.

The plurality of diamond particles sintered to form the at least partially leached PCD table 202 may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 μm and 20 μm). More particularly, in various embodiments, the plurality of diamond particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 10 μm, 15 μm, 12 μm, 10 μm, 8 μm, 4 μm, 2 μm, 1 μm, 0.5 μm, less than 0.5 μm, 0.1 μm, less than 0.1 μm). In another embodiment, the plurality of diamond particles may include a portion exhibiting a relatively larger size between about 40 μm and about 15 μm and another portion exhibiting a relatively smaller size between about 12 μm and 2 μm. Of course, the plurality of diamond particles may also include three or more different sizes (e.g., one relatively larger size and two or more relatively smaller sizes) without limitation.

In an embodiment, prior to infiltrating and bonding the at least partially leached PCD table 202 to the substrate 108 in an HPHT process, the at least partially leached PCD table 202 may be cleaned to remove leaching by-products generated during the leaching process. Suitable cleaning processes for cleaning the at least partially leached PCD table 202 are disclosed in U.S. patent application Ser. No. 12/120,849, the disclosure of which is incorporated herein, in its entirety, by this reference.

Figure 3:
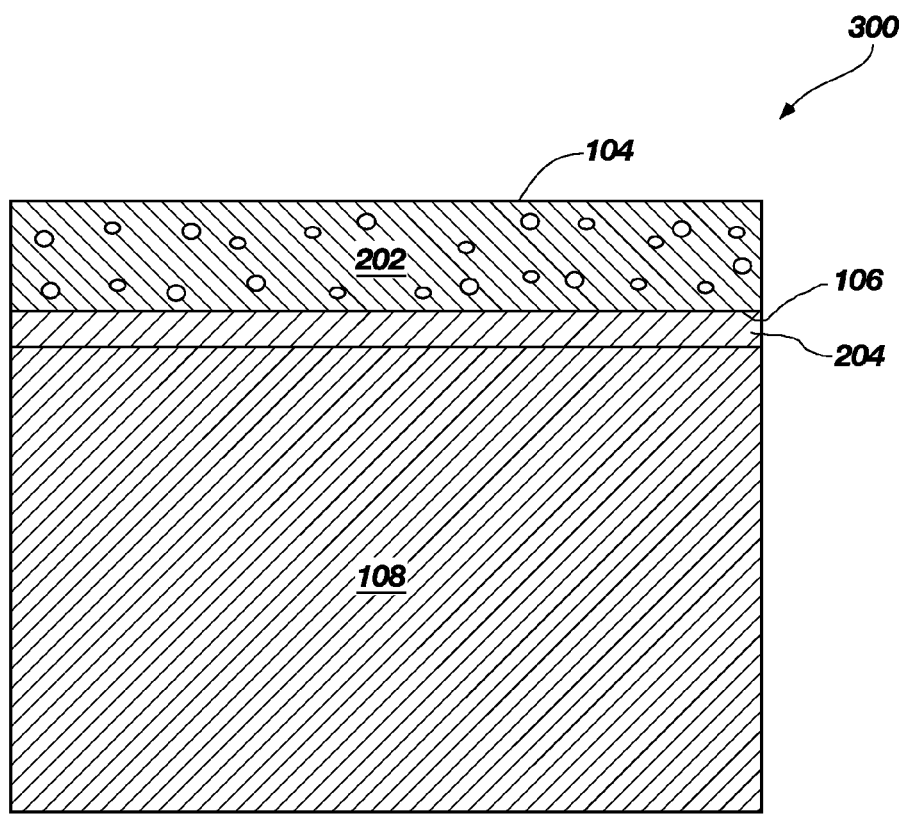
FIG. 3 is cross-sectional view of another assembly to be HPHT processed to form the PDC shown in FIG. 1 according to another embodiment of a method.

FIG. 3 is cross-sectional view of an assembly 300 to be HPHT processed to form the PDC 100 shown in FIG. 1 according to another embodiment of a method. The assembly 300 may be formed by positioning the at least one silicon-cobalt containing layer 204 between the back surface 106 of the at least partially leached PCD table 202 and the substrate 108. The assembly 300 may be subjected to the same or similar HPHT conditions used to HPHT process the assembly 200 shown in FIG. 2A. Following HPHT processing of the assembly 300, the resulting intermediate PDC structure is the same or very similar to the intermediate PDC structure shown in FIG. 2B and the PDC 100 may be formed by exposing the intermediate PDC structure to a suitable acid as discussed above.

In another embodiment, the silicon-cobalt containing layer 204 may be replaced with a silicon-containing layer that is generally free of cobalt. For example, the silicon-containing layer may include a plurality of silicon particles, a thin disc made from silicon, a green layer of silicon particles, or combinations of foregoing. In such an embodiment, the interstitial regions of the upper region 212 may be occupied by silicon carbide, silicon that has not reacted with the diamond grains of the at least partially leached PCD table 202, or combinations of the foregoing. Despite the absence of cobalt in the upper region 212, the first thermally-stable region 110 (FIG. 1) formed by exposing the upper region 212 to one or more of the aforementioned acids may also exhibit at least an improved thermal stability relative to the unaffected portion of the upper region 212 shown in FIG. 1 as the second intermediate region 112 due to depleting the first thermally-stable region 110 of one or more types of oxides (e.g., silicon oxide) relative to the second intermediate region 112. In some embodiments, the first thermally-stable region 110 (FIG. 1) formed by exposing the upper region 212 to one or more of the aforementioned acids may also exhibit an improved wear resistance relative to the unaffected portion of the upper region 212 shown in FIG. 1 as the second intermediate region 112. The depletion of the one or more types of oxides may result in the first thermally-stable region 110 being partially or substantially free of such one or more types of oxides.

In an embodiment, a PDC may be fabricated using multiple HPHT cycles. For example, the at least partially leached PCD table 202 may be HPHT bonded to the substrate 108 in a first HPHT cycle that also infiltrates substantially all of the interstitial regions with a metal-solvent catalyst infiltrant (e.g., cobalt from a cobalt-cemented tungsten carbide substrate) from the substrate 108. Following the first HPHT cycle, the metal-solvent catalyst infiltrant may be removed to a selected depth using a leaching process. Following leaching, a second infiltrant may be infiltrated into the interstitial regions in a second HPHT cycle and, the infiltrated PCD table may be exposed to any of the aforementioned acids. For example, the second infiltrant may comprise silicon and cobalt provided from at least one silicon-cobalt containing layer 204. In an embodiment, following the second HPHT cycle, the infiltrated PCD table may be subjected to a second leaching process to remove at least a portion of the second infiltrant and, after the second leaching process, infiltrated in a third HPHT cycle with a third infiltrant provided from at least one silicon-cobalt containing layer 204, a silicon-containing layer that is substantially free of cobalt, or another suitable infiltrant. Following infiltration of the PCD table in the third HPHT cycle, the infiltrated PCD table may be exposed to any of the aforementioned acids.

Figure 4:
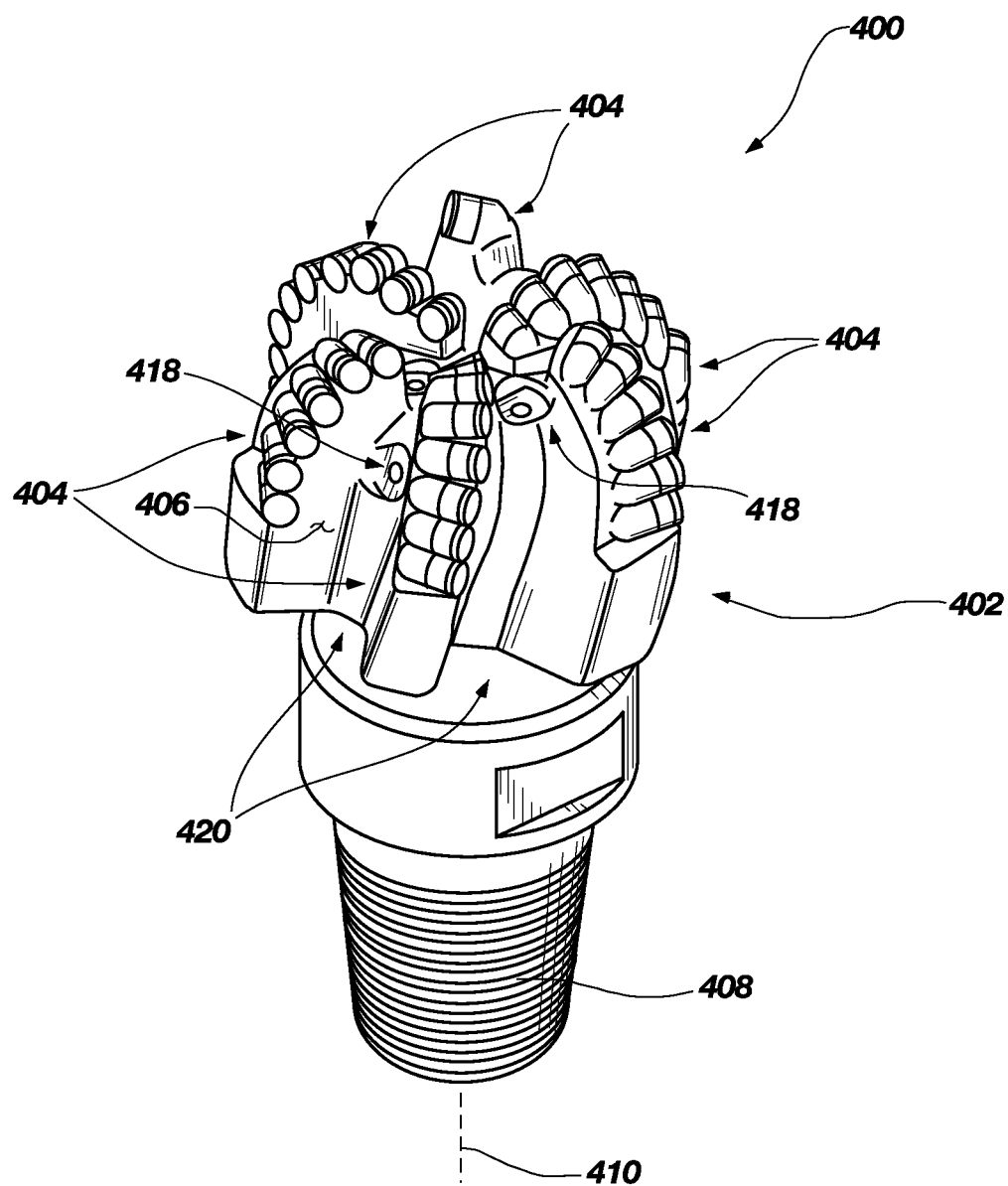
FIG. 4 is an isometric view of an embodiment of a rotary drill bit that may employ one or more of the disclosed PDC embodiments.
Figure 5:
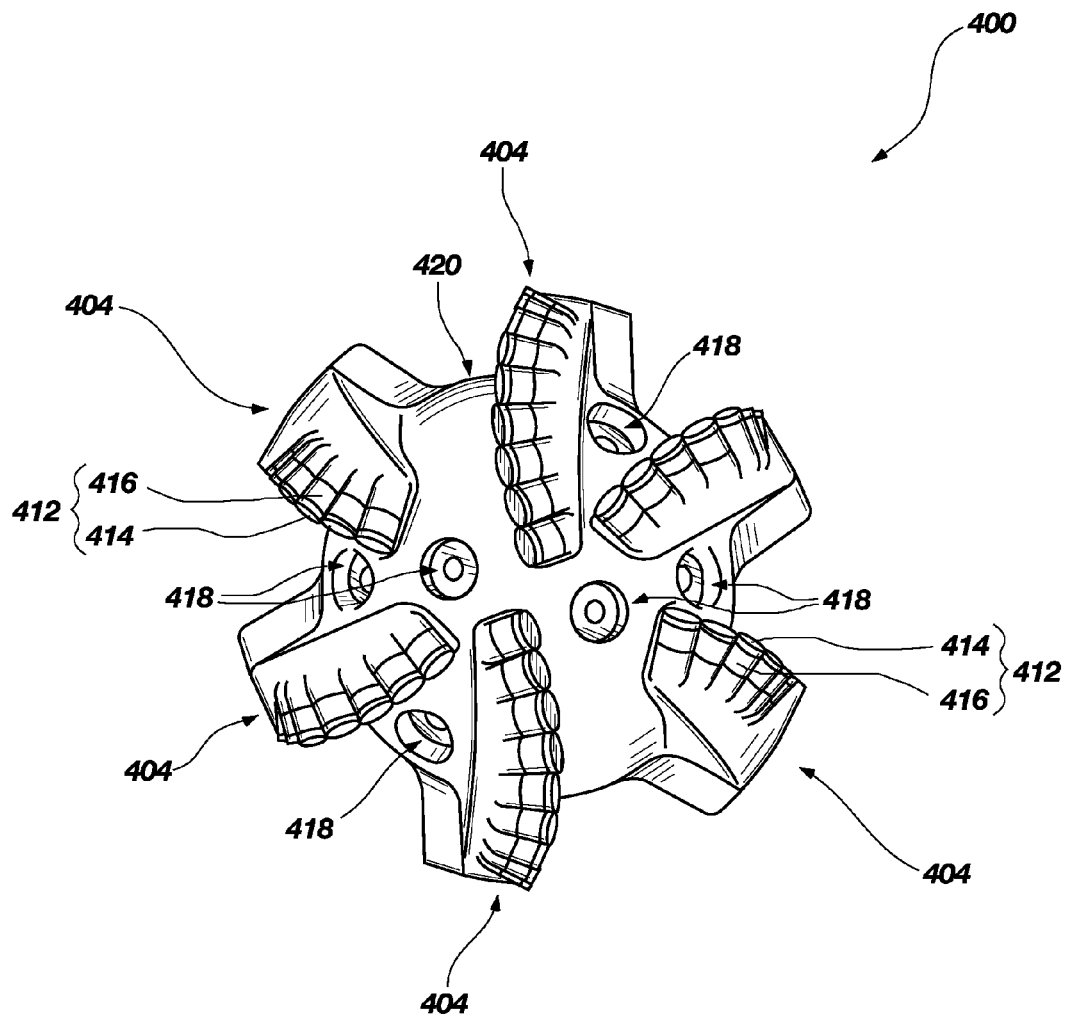
FIG. 5 is a top elevation view of the rotary drill bit shown in FIG. 4.

FIG. 4 is an isometric view and FIG. 5 is a top elevation view of an embodiment of a rotary drill bit 400. The rotary drill bit 400 includes at least one PDC configured according to any of the previously described PDC embodiments, such as the PDC 100 of FIG. 1. The rotary drill bit 400 comprises a bit body 402 that includes radially and longitudinally extending blades 404 having leading faces 406, and a threaded pin connection 408 for connecting the bit body 402 to a drilling string. The bit body 402 defines a leading end structure for drilling into a subterranean formation by rotation about a longitudinal axis 410 and application of weight-on-bit. At least one PDC, configured according to any of the previously described PDC embodiments, may be affixed to the bit body 402. With reference to FIG. 5, a plurality of PDCs 412 are secured to the blades 404 of the bit body 402. For example, each PDC 412 may include a pre-sintered PCD table 414 bonded to a substrate 416. More generally, the PDCs 412 may comprise any PDC disclosed herein, without limitation. In addition, if desired, in some embodiments, a number of the PDCs 412 may be conventional in construction. Also, circumferentially adjacent blades 404 define so-called junk slots 420 therebetween. Additionally, the rotary drill bit 400 includes a plurality of nozzle cavities 418 for communicating drilling fluid from the interior of the rotary drill bit 400 to the PDCs 412.

FIGS. 4 and 5 merely depict one embodiment of a rotary drill bit that employs at least one PDC fabricated and structured in accordance with the disclosed embodiments, without limitation. The rotary drill bit 400 is used to represent any number of earth-boring tools or drilling tools, including, for example, core bits, roller-cone bits, fixed-cutter bits, eccentric bits, bicenter bits, reamers, reamer wings, or any other downhole tool including superabrasive compacts, without limitation.

The PDCs disclosed herein (e.g., the PDC 100 shown in FIG. 1) may also be utilized in applications other than cutting technology. For example, the disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used on any apparatus or structure in which at least one conventional PDC is typically used. In one embodiment, a rotor and a stator, assembled to form a thrust-bearing apparatus, may each include one or more PDCs (e.g., the PDC 100 shown in FIG. 1) configured according to any of the embodiments disclosed herein and may be operably assembled to a downhole drilling assembly. U.S. Pat. Nos. 4,410,054; 4,560, 014; 5,364,192; 5,368,398; and 5,480,233, the disclosure of each of which is incorporated herein, in its entirety, by this reference, disclose subterranean drilling systems within which bearing apparatuses utilizing superabrasive compacts disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811, 801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

The following working examples provide further detail in connection with the specific embodiments described above.

Comparative Working Example 1

A PDC was formed according to the following process. A PCD table was formed by HPHT sintering, in the presence of cobalt, diamond particles having an average grain size of about 19 μm. The PCD table included bonded diamond grains, with cobalt disposed within interstitial regions between the bonded diamond grains. The PCD table was leached with acid for a time sufficient to remove substantially all of the cobalt from the interstitial regions to form an at least partially leached PCD table. The at least partially leached PCD table was placed adjacent to a cobalt-cemented tungsten carbide substrate. A layer of silicon and cobalt particles was placed adjacent to the at least partially leached PCD table on a side thereof opposite the cobalt-cemented tungsten carbide substrate. The silicon was present in an amount of about 60 wt % and the cobalt was present in an amount of about 40 wt %. The at least partially leached PCD table, cobalt-cemented tungsten carbide substrate, and layer of silicon and cobalt particles were HPHT processed in a high-pressure cubic press at a temperature of about 1400° C. and a pressure of about 5 GPa to about 7 GPa to form a PDC comprising an infiltrated PCD table bonded to the cobalt-cemented tungsten carbide substrate.

Figure 6:
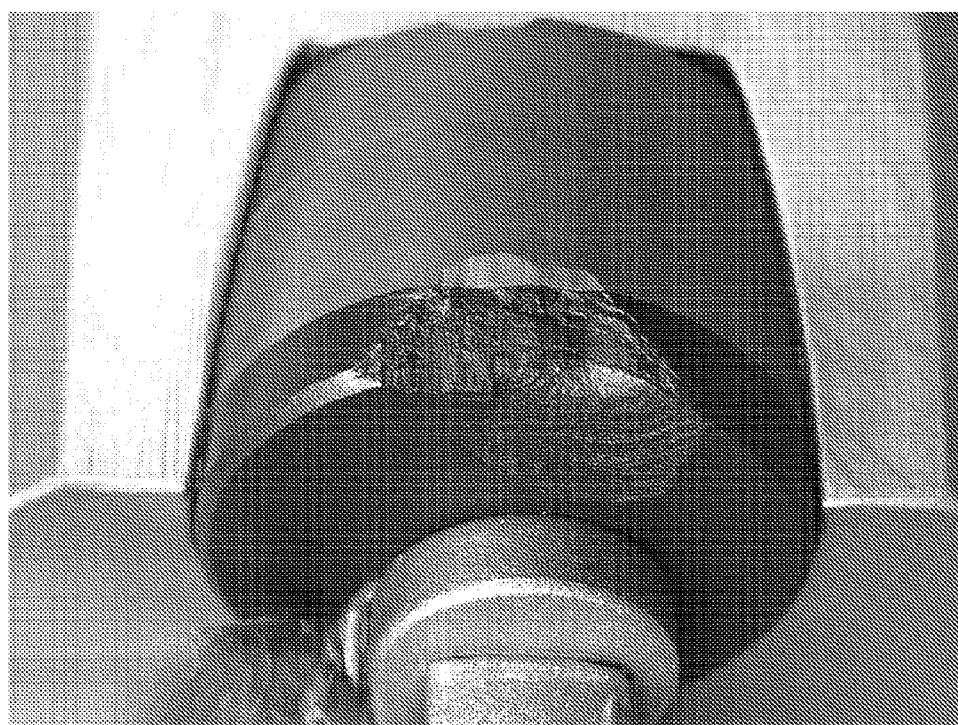
FIG. 6 is a photograph of the wear flat formed on the PCD table of comparative working example 1 after cutting a Barre granite workpiece.

The wear characteristics of the infiltrated PCD table of the PDC of comparative working example 1 were evaluated by examining the wear flat of the infiltrated PCD table after cutting a Bane granite workpiece in a vertical turret lathe test while the workpiece was cooled using coolant. FIG. 6 is a photograph of the wear flat formed on the infiltrated PCD table of comparative working example 1 after cutting about 1400 in$^3$ of the workpiece. The measured wear-flat volume of the infiltrated PCD table removed as a result of cutting about 1400 in$^3$ of the workpiece was about $1.0 \times 10^{-4}$ in$^3$.

Working Example 2

A PDC was formed as in comparative working example 1, and the infiltrated PCD table of the PDC so-formed was exposed to an acid to affect an upper region of the infiltrated PCD table. The wear characteristics of the infiltrated PCD table of the PDC of working example 2 were evaluated by examining the wear flat of the infiltrated PCD table after cutting a Barre granite workpiece in a vertical turret lathe test while the workpiece was cooled using coolant. The same cutting parameters were used as in the vertical turret lathe test used on the PDC of comparative working example 1.

Figure 7:
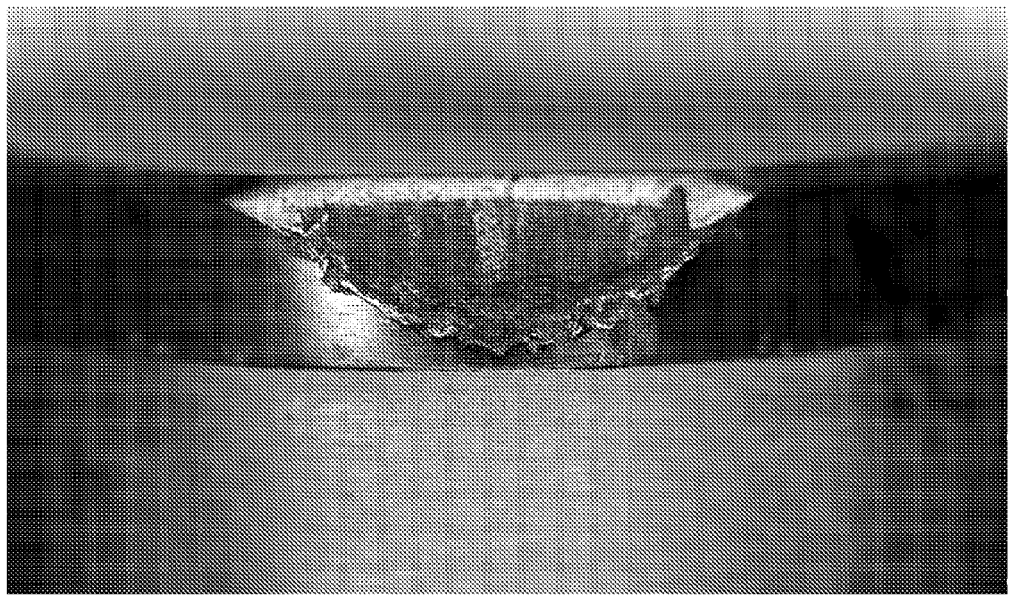
FIG. 7 is a photograph of the wear flat formed on the PCD table of working example 2 after cutting a Barre granite workpiece.

FIG. 7 is a photograph of the wear flat formed on the infiltrated PCD table of working example 2 after cutting about 1400 in$^3$ of the workpiece. The measured wear-flat volume of the infiltrated PCD table removed as a result of cutting about 1400 in$^3$ of the workpiece was about $7.5 \times 10^{-5}$ in$^3$. Thus, the infiltrated PCD table of working example 2 has a significantly smaller wear-flat volume for the same volume of Barre granite removed than the infiltrated PCD table of comparative working example 1.

As shown in FIG. 7, a well-defined cutting lip is formed in the infiltrated PCD table of working example 2 because the upper region affected by the exposure to the acid exhibits a greater wear resistance and/or thermal stability than the underlying region of the infiltrated PCD table unaffected by the nitric acid. Referring again to FIG. 6, in contrast to the infiltrated PCD table of working example 2, the infiltrated PCD table of the PDC of comparative working example 1 does not exhibit a well-defined cutting lip. Instead, the infiltrated PCD table of comparative working example 1 wears more uniformly, is relatively less wear resistant, and is relatively less thermally stable than that of the infiltrated PCD table of working example 2.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A polycrystalline diamond compact, comprising:
   a substrate; and
   a pre-sintered polycrystalline diamond table including a plurality of bonded diamond grains defining a plurality of interstitial regions and exhibiting diamond-to-diamond bonding therebetween, an upper surface, and a back surface that is bonded to the substrate, the pre-sintered polycrystalline diamond table including:

a first thermally-stable region extending inwardly from the upper surface; and a second region located between the first thermally-stable region and the substrate, the second region exhibiting a thermal stability that is less than that of the first thermally-stable region, the second region including at least one interstitial constituent disposed interstitially between the bonded diamond grains thereof, the at least one interstitial constituent including at least one silicon-containing phase.

2. The polycrystalline diamond compact of claim 1 wherein the at least one silicon-containing phase comprises at least one member selected from the group consisting of silicon carbide, a mixed carbide of cobalt and silicon, silicon, and a silicon-cobalt alloy phase.

3. The polycrystalline diamond compact of claim 2 wherein the silicon-cobalt alloy phase comprises cobalt silicide.

4. The polycrystalline diamond compact of claim 1 wherein the at least one interstitial constituent comprises at least one cobalt-containing phase.

5. The polycrystalline diamond compact of claim 4 wherein the at least one cobalt-containing phase comprises at least one member selected from the group consisting of cobalt and cobalt carbide.

6. The polycrystalline diamond compact of claim 1 wherein the first thermally-stable region of the pre-sintered polycrystalline diamond table is depleted of cobalt relative to the second region.

7. The polycrystalline diamond compact of claim 1 wherein the first thermally-stable region of the pre-sintered polycrystalline diamond table is depleted of cobalt relative to the second region, and further wherein the first thermally-stable region includes at least one interstitial constituent disposed interstitially between the bonded diamond grains thereof, the at least one interstitial constituent of the first thermally-stable region selected from the group consisting of silicon carbide, cobalt carbide, a mixed carbide of cobalt and silicon, and cobalt silicide.

8. The polycrystalline diamond compact of claim 1 wherein the first thermally-stable region of the pre-sintered polycrystalline diamond table is substantially free of cobalt that is not included in a chemical compound.

9. The polycrystalline diamond compact of claim 1 wherein the first thermally-stable region of the pre-sintered polycrystalline diamond table is depleted of one or more types of oxides relative to the second region.

10. The polycrystalline diamond compact of claim 1 wherein the first thermally-stable region of the pre-sintered polycrystalline diamond table is depleted of one or more types of oxides relative to the second region, and further wherein the first thermally-stable region includes silicon carbide disposed interstitially between the bonded diamond grains thereof and is substantially free of cobalt.

11. The polycrystalline diamond compact of claim 1 wherein the first thermally-stable region of the pre-sintered polycrystalline diamond table exhibits a wear resistance that is greater than that of the second region.

12. The polycrystalline diamond compact of claim 1 wherein the pre-sintered polycrystalline diamond table comprises a third region adjacent to the second region and bonded to the substrate, the third region including a metallic infiltrant infiltrated from the substrate that is interstitially disposed between the bonded diamond grains thereof.

13. The polycrystalline diamond compact of claim 1 wherein the pre-sintered polycrystalline diamond table comprises tungsten, tungsten carbide, or combinations thereof disposed interstitially between the bonded diamond grains thereof.

14. The polycrystalline diamond compact of claim 1 wherein the substrate comprises a cemented carbide.

15. The polycrystalline diamond compact of claim 1 wherein the first thermally-stable region of the pre-sintered polycrystalline diamond table is structured to preferentially form a cutting lip during cutting operations over the second region of the pre-sintered polycrystalline diamond table.

16. The polycrystalline diamond compact of claim 1 wherein the first thermally-stable region of the pre-sintered polycrystalline diamond table has been chemically treated to enhance a thermal stability thereof compared to the thermally stability of the second region of the pre-sintered polycrystalline diamond table.

17. A polycrystalline diamond compact, comprising:
a cemented carbide substrate including a metallic infiltrant therein; and
a pre-sintered polycrystalline diamond table including a plurality of bonded diamond grains defining a plurality of interstitial regions and exhibiting diamond-to-diamond bonding therebetween, an upper surface, and a back surface that is bonded to the substrate, the pre-sintered polycrystalline diamond table including:
a first thermally-stable region extending inwardly from the upper surface;
wherein the first thermally-stable region is substantially free of cobalt that is not included in a chemical compound, depleted of one or more types of oxides relative to the second region, or combinations thereof; and
wherein the first thermally-stable region includes silicon carbide disposed interstitially between the bonded diamond grains thereof;
a second region located between the first thermally-stable region and the substrate, the second region exhibiting a thermal stability that is less than that of the first thermally-stable region, the second region including at least one interstitial constituent disposed interstitially between the bonded diamond grains thereof, the at least one interstitial constituent including at least one silicon-containing phase; and
a third region bonded to the substrate, the third region positioned relative to the first thermally-stable region and the second region so that the second region is located between the first thermally-stable region and the third region, the third region including a portion of the metallic infiltrant infiltrated from the substrate that is interstitially disposed between the bonded diamond grains thereof.

18. The polycrystalline diamond compact of claim 17 wherein the first thermally-stable region of the pre-sintered polycrystalline diamond table is structured to preferentially form a cutting lip during cutting operations over the second region of the pre-sintered polycrystalline diamond table.

19. The polycrystalline diamond compact of claim 17 wherein the at least one silicon-containing phase comprises at least one member selected from the group consisting of silicon carbide, a mixed carbide of cobalt and silicon, silicon, and a silicon-cobalt alloy phase.

* * * * *